United States Patent
Nakane et al.

(10) Patent No.: US 6,703,478 B2
(45) Date of Patent: Mar. 9, 2004

(54) POLYESTER CONTINUOUS PRODUCTION PROCESS

(75) Inventors: Mikio Nakane, Matuyama (JP); Kentaro Yamaguchi, Matuyama (JP); Fuminori Takenaga, Matuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/019,129

(22) PCT Filed: Apr. 25, 2001

(86) PCT No.: PCT/JP01/03566
§ 371 (c)(1),
(2), (4) Date: Dec. 27, 2001

(87) PCT Pub. No.: WO01/83582
PCT Pub. Date: Nov. 8, 2001

(65) Prior Publication Data
US 2002/0161166 A1 Oct. 31, 2002

(30) Foreign Application Priority Data

Apr. 27, 2000 (JP) .......................... 2000-127306
Aug. 10, 2000 (JP) .......................... 2000-242456

(51) Int. Cl.$^7$ .................................. C08F 6/00
(52) U.S. Cl. .................. 528/501; 528/481; 528/503
(58) Field of Search ...................... 528/481, 501, 528/503

(56) References Cited

U.S. PATENT DOCUMENTS

| | | |
|---|---|---|
| 3,878,055 A | 4/1975 | Cox et al. |
| 4,146,729 A | 3/1979 | Goodley et al. |
| 4,180,635 A | 12/1979 | Fischer et al. |
| 4,680,376 A | 7/1987 | Heinze et al. |
| 5,236,558 A | 8/1993 | Buyalos et al. |
| 5,635,590 A | 6/1997 | Rink et al. |
| 5,932,105 A | 8/1999 | Kelly |

FOREIGN PATENT DOCUMENTS

| | | |
|---|---|---|
| EP | 0 913 418 A1 | 5/1999 |
| JP | 53-126096 | 11/1978 |
| JP | 55-56120 | 4/1980 |
| JP | 55-33734 | 9/1980 |
| JP | 60-163918 | 8/1985 |
| JP | 4-65426 | 3/1992 |
| JP | 7-100734 | 11/1995 |
| JP | 9-124783 | 5/1997 |
| JP | 10-279677 | 10/1998 |
| JP | 11-147944 A | 6/1999 |
| JP | 11 417944 A | 6/1999 |
| KR | 9506718 | 6/1995 |

OTHER PUBLICATIONS

International Search Report.

*Primary Examiner*—Samuel A. Acquah
(74) *Attorney, Agent, or Firm*—Sughrue Mion, PLLC (57) ABSTRACT

A process for continuously producing a polyester comprising an aromatic dicarboxylic acid or a lower alkyl ester thereof and an alkylene glycol having 2 to 4 carbon atoms as the main glycol component by recycling part or all of a distillate comprising an alkylene glycol having 2 to 4 carbon atoms recovered from a polycondensation reaction step as the main component as a raw material for the polyester. Low-boiling substances contained in the distillate are separated by flush distillation and the distillate is supplied to an ester exchange reaction step or esterification reaction step.

8 Claims, 3 Drawing Sheets

POLYESTER CONTINUOUS PRODUCTION PROCESS

TECHNICAL FIELD OF THE INVENTION

The present invention relates to a polyester continuous production process. More specifically, it relates to a process for producing a polyester comprising an aromatic carboxylic acid and an alkylene glycol having 2 to 4 carbon atoms as main components stably and continuously while low-boiling substances are removed from a glycol component recovered from a polycondensation reaction step to recycle the glycol component.

DESCRIPTION OF THE PRIOR ART

Heretofore, polyesters comprising an alkylene glycol having 2 to 4 carbon atoms as the main glycol component, especially polyalkylene terephthalate has been widely used for various purposes due to its excellent physical and chemical properties. Particularly, fiber, film and other molded products thereof are widely used in industrial textiles such as clothing and tire cords, engineering plastics and the like thanks to their excellent mechanical properties such as strength and elastic modulus, and heat resistance.

Generally speaking, polyalkylene terephthalate for use in the above application fields is produced by a direct polymerization method or ester exchange method. The direct polymerization method comprises the steps of forming a polyester precursor through a direct esterification reaction between an acid component and a glycol component and polycondensing the polyester precursor at normal pressure or reduced pressure. The ester exchange method comprises the steps of forming a polyester precursor through an ester exchange reaction between a lower alkyl ester of an acid component and a glycol and polycondensing the polyester precursor at normal pressure or reduced pressure.

The glycol component distilling out from the polycondensation reaction step is generally condensed by a tube type heat exchanger or wet type condenser, recovered and re-used as part of a raw material. Generally speaking, the distilling alkylene glycol having 2 to 4 carbon atoms contains various low-boiling substances by-produced mainly by a decomposition reaction which occurs during a polycondensation reaction and by other side reactions as well as water by-produced in the esterification reaction step and a lower alkyl alcohol by-produced in the ester exchange reaction step. For example, in the production of polybutylene terephthalate, 1,4-butanediol distilling out from a polycondensation reaction contains tetrahydrofuran, water and the like formed by the dehydration/cyclization reaction of 1,4-butanediol itself. In the production of polyethylene terephthalate, ethylene glycol distilling out from a polycondensation reaction contains acetaldehyde, 2-methyl-1,3-dioxolan, methyl cellosolve, 1,4-dioxane, water and the like formed mainly by a decomposition reaction which occurs during a polycondensation reaction. In the production of polypropylene terephthalate, 1,3-propanediol distilling out from a polycondensation reaction contains acrolein, allyl alcohol, 3-ethoxy-1-propanol, water and the like formed mainly by a decomposition reaction which occurs during a polycondensation reaction. Therefore, when the above glycol component is directly used as a raw material without being distilled, the distillation load of a distillation column attached to an ester exchange reactor or esterification reactor is increased or changed by these low-boiling substances contained in the glycol component, thereby causing such a problem that the production process becomes instable. Particularly when the amount of water contained is large, the activity of a reaction catalyst is impeded, the reaction factor does not become constant, the production process becomes instable, the quality of the final product varies, or the color of the final product worsens. To avoid these problems, it is desired that the glycol component should be subjected to a distillation step separate from a system to be purified before it is recycled. Since this method requires not only a large amount of investment in the installation of equipment such as a distillation column and a storage tank but also high running cost, it cannot be said that this method is economically advantageous. Therefore, there are proposed processes which the process does not become instable even when the distilling glycol component is recycled as a raw material without purification.

As one of the processes, JP-B 55-33734 (the term "JP-B" as used herein means an "examined Japanese patent publication") discloses a polybutylene terephthalate production process in which a glycol component distilling out at a pressure of less than 101 kPa and 0.27 kPa or more in-a polycondensation reaction step as a distillate from the polycondensation reaction step is recycled as a raw material without purification by a distillation step. JP-A 10-279677 (the term "JP-A" as used herein means an "unexamined published Japanese patent application") discloses a polyester direct polymerization method in which a glycol component distilling out from a second esterification reaction tank is recycled as a raw material without purification by a distillation step. JP-A 09-124783 discloses a polyester production process in which a glycol component distilling out from a polycondensation reaction step is recycled as a raw material to be added to an esterification reaction tank in a method of direct polymerization without purification by a distillation step. However, as the glycol component contains water enough to deactivate a catalyst in all of the above processes, when it is recycled as a raw material for an ester exchange reaction or esterification reaction, water contacts the catalyst and affects the activity thereof, thereby making the fluctuation of the process inevitable.

JP-A 04-65426 discloses a polyester production process in which a distilling glycol component is directly recycled in limits to ensure that the total content of water contained in all the raw materials should be 0.5 wt % or less. In this case, it is possible to stabilize the process but the glycol component which can be recycled is very small in quantity and most of the distilling glycol component must be purified. Therefore, the installation of distillation equipment is essential and it cannot be said that this process is economical.

JP-B 7-100734 shows a polybutylene terephthalate direct polymerization method in which a glycol component containing tetrahydrofuran and water which is a condensate from a polycondensation device is supplied to a distillation column attached to an esterification reactor in examples. This polyester production method is effective because new distillation equipment does not need to be installed as a subsidiary equipment. However, as tetrahydrofuran and other low-boiling substances are supplied at the same time, the distillation load of the distillation column attached to the ester exchange reactor or esterification reactor increases. This is not taken into account in this method and it is difficult to achieve the target total content of low-boiling substances by this method alone.

JP-A 53-126096 teaches a process for producing polyethylene terephthalate by the direct polymerization method in which an ethylene glycol component formed in an esterification reaction step is introduced into a distillation column attached to an esterification reactor to remove low-boiling components and then recycled as a raw material. Only the esterification reaction step is taken into account in this process and the recycling of the ethylene glycol component formed from the polycondensation step as it is is not mentioned at all. That is, ethylene glycol formed in the polycondensation step must be purified in a large-scale distillation step separate from a system. Therefore, it cannot always be said that this process is economical.

JP-A 60-163918 discloses a process for producing polyethylene terephthalate by the direct polymerization method in which a gas essentially composed of an ethylene glycol component formed from a polycondensation reactor is condensed by a wet type condenser and the condensate is introduced into a distillation column attached to an esterification reactor to remove low-boiling impurities and recycled as a raw material. This polyethylene terephthalate production process is effective because new distillation equipment does not need to be installed as a subsidiary equipment but the distillation load of the distillation column attached to the esterification reactor increases and a large distillation column must be installed. Therefore, it cannot always be said that this process is economical and it is difficult to achieve the target total content of low-boiling substances by this process alone.

JP-A 55-56120 discloses a process for producing polyethylene terephthalate by the direct polymerization method in which an ethylene glycol component distilling out from an esterification reaction step and an ethylene glycol component distilling out and recovered from a polycondensation reaction step are mixed together and recycled as a raw material. In this process, ethylene glycol which is purified in a separate step must be supplied to a wet type condenser attached to a polycondensation reactor as a recycled liquid in large quantities. Like other processes, ethylene glycol must be purified with distillation equipment in a separate step. Therefore, it cannot always be said that this process is economical.

SUMMARY OF THE INVENTION

In view of the above problems, it is an object of the present invention to provide a process for continuously producing a polyester by polymerizing an aromatic dicarboxylic acid or a lower alkyl ester thereof and a glycol component essentially composed of an alkylene glycol having 2 to 4 carbon atoms, wherein the glycol component essentially composed of an alkylene glycol having 2 to 4 carbon atoms distilling out from a polycondensation reaction step is recycled as a raw material without purification using large-scale distillation equipment, the reaction step does not become instable thereby, a polyester having stable quality is obtained, the equipment can be simplified, and the running cost can be cut.

Other objects and advantages of the present invention will become apparent from the following description.

According to the present invention, the above objects and advantages of the present invention are attained by a process for continuously producing an aromatic polyester comprising an aromatic dicarboxylic acid as the main dicarboxylic acid component and at least one glycol selected from the group consisting of ethylene glycol, 1,3-propanediol and 1,4-butanediol as the main glycol component through an esterification or ester exchange reaction and a polycondensation reaction, wherein the distillate containing the above glycol from the polycondensation reaction is subjected to at least flush distillation to remove low-boiling substances and at least part of the residue is recycled to the above esterification or ester exchange reaction as part of the above glycol.

THE PREFERRED EMBODIMENT OF THE INVENTION

A preferred embodiment of the present invention will be described hereinbelow.

The aromatic polyester to be produced by the present invention is a polyester which comprises an aromatic dicarboxylic acid as the main dicarboxylic acid component and ethylene glycol, 1,3-propanediol or 1,4-butanediol as the main glycol component.

The reactions for producing the above aromatic polyester in the present invention are an ester exchange reaction or esterification reaction and a subsequent polycondensation reaction. Preferably, the aromatic dicarboxylic acid component is derived from a raw material used as a lower alkyl ester of an aromatic dicarboxylic acid in the ester exchange reaction or from a raw material used as a free aromatic dicarboxylic acid in the esterification reaction.

Examples of the aromatic dicarboxylic acid used in the present invention include terephthalic acid, isophthalic acid, phthalic acid, naphthalenedicarboxylic acid, diphenoxycarboxylic acid and diphenoxyethanedicarboxylic acid. Examples of the lower alkyl ester of the aromatic dicarboxylic acid include dimethyl terephthalate, dimethyl isophthalate and dimethylnaphthalene dicarboxylate.

In the present invention, the expression "main glycol component" constituting the polyester means that the amount of the component is 50 mol % or more, preferably 80 mol % or more, more preferably 98 mol % or more of the total of all the glycol components.

The alkylene glycol having 2 to 4 carbon atoms is ethylene glycol, 1,3-propanediol or 1,4-butanediol.

Glycol components other than the alkylene glycol having 2 to 4 carbon atoms, which may be used in a small amount, include ethylene glycol (when the main glycol is other than ethylene glycol), neopentyl glycol, 1,2-propanediol, 1,3-propanediol (when the main glycol is other than 1,3-propanediol), 1,3-butanediol, 1,4-butanediol (when the main glycol is other than 1,4-butanediol), 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol and propylene glycol. These glycol components may be used alone or in combination of two or more. The alkylene glycol having 2 to 4 carbon atoms may be contained in an amount of 100 mol % of the total of all the glycol components.

A polyfunctional compound having a functionality of 3 or more such as trimellitic acid, pyromellitic acid or glycerol, or a monofunctional compound such as benzoic acid or phenyl isocyanate may be copolymerized in the polyester of the present invention.

The polyester of the present invention is produced in the presence of a catalyst.

The catalyst used in the present invention is a known reaction catalyst, as exemplified by antimony compounds, manganese compounds, titanium compounds, tin compounds, zinc compounds, magnesium compounds and germanium compounds. The position of the polyester to which the catalyst is introduced and the method of supplying the catalyst are not particularly limited and may be suitably determined according to production conditions.

Optionally, more than one of other thermoplastic resins, additives, inorganic fillers and organic fillers which are commonly used may be added to the reaction steps of the present invention directly or together with the glycol component, or may be kneaded directly at the outlet of the final polycondensation reactor by a molding machine, extruder or mixer. After pelletization, they may be re-molten and kneaded as a matter of course.

In the present invention, low-boiling substances separated from the distillate or bottoms containing an alkylene glycol having 2 to 4 carbon atoms are water, acetaldehyde, 2-methyl-1,3-dioxolan and methyl cellosolve and/or what has a boiling point of 165° C. or less other than these compounds when ethylene glycol is used as the alkylene glycol having 2 to 4 carbon atoms. When 1,3-propanediol is used as the alkylene glycol having 2 to 4 carbon atoms, the low-boiling substances are water, allyl alcohol, acrolein and 3-ethoxy-1-propanol and/or what has a boiling point of 165° C. or less other than these compounds. When 1,4-butanediol is used as the alkylene glycol having 2 to 4 carbon atoms, the low-boiling substances are tetrahydrofuran and water and/or what has a boiling point of 165° C. or less other than tetrahydrofuran.

Figure 1:
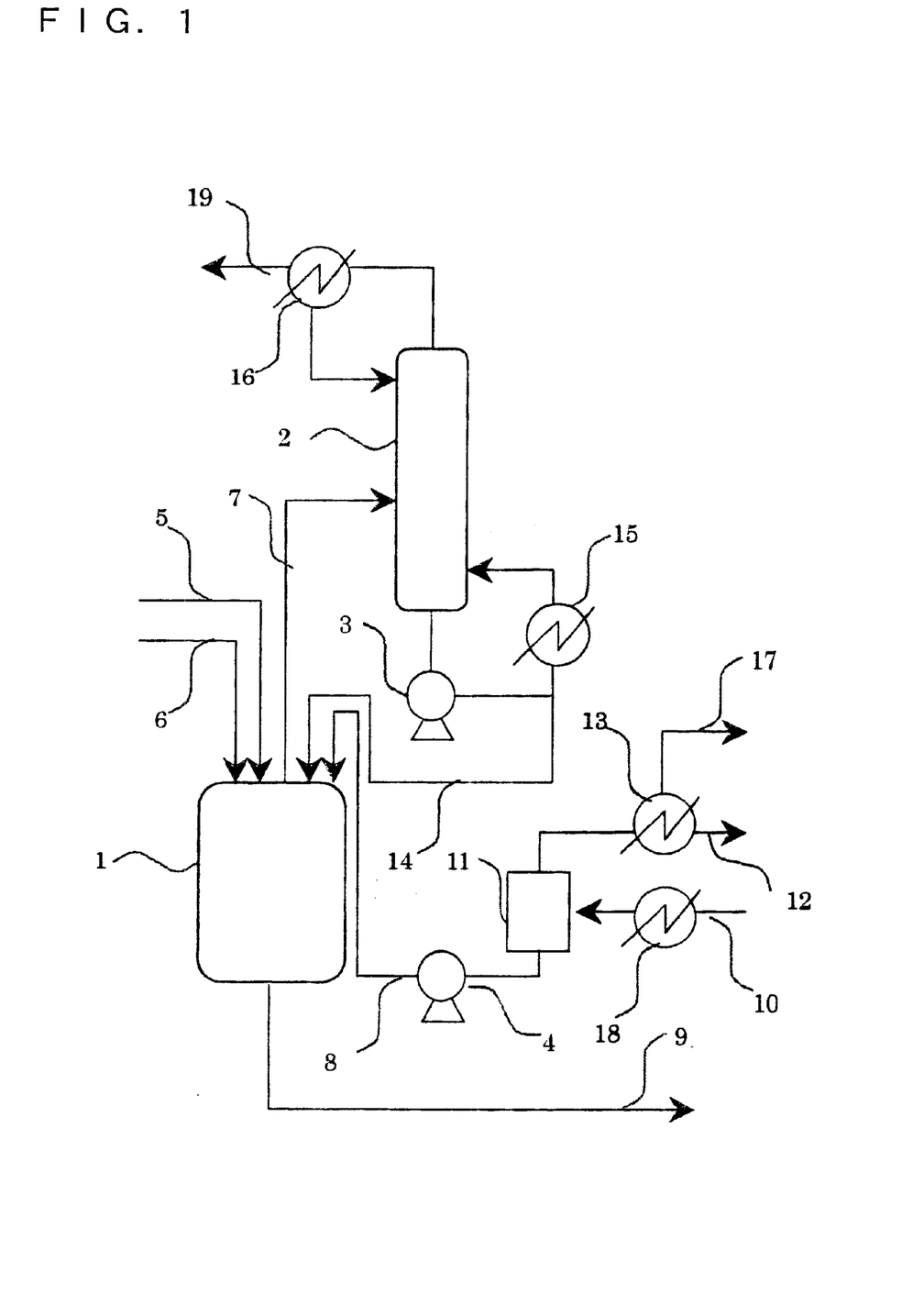
FIG. 1 is a typical flow diagram for carrying out the present invention.
Figure 2:
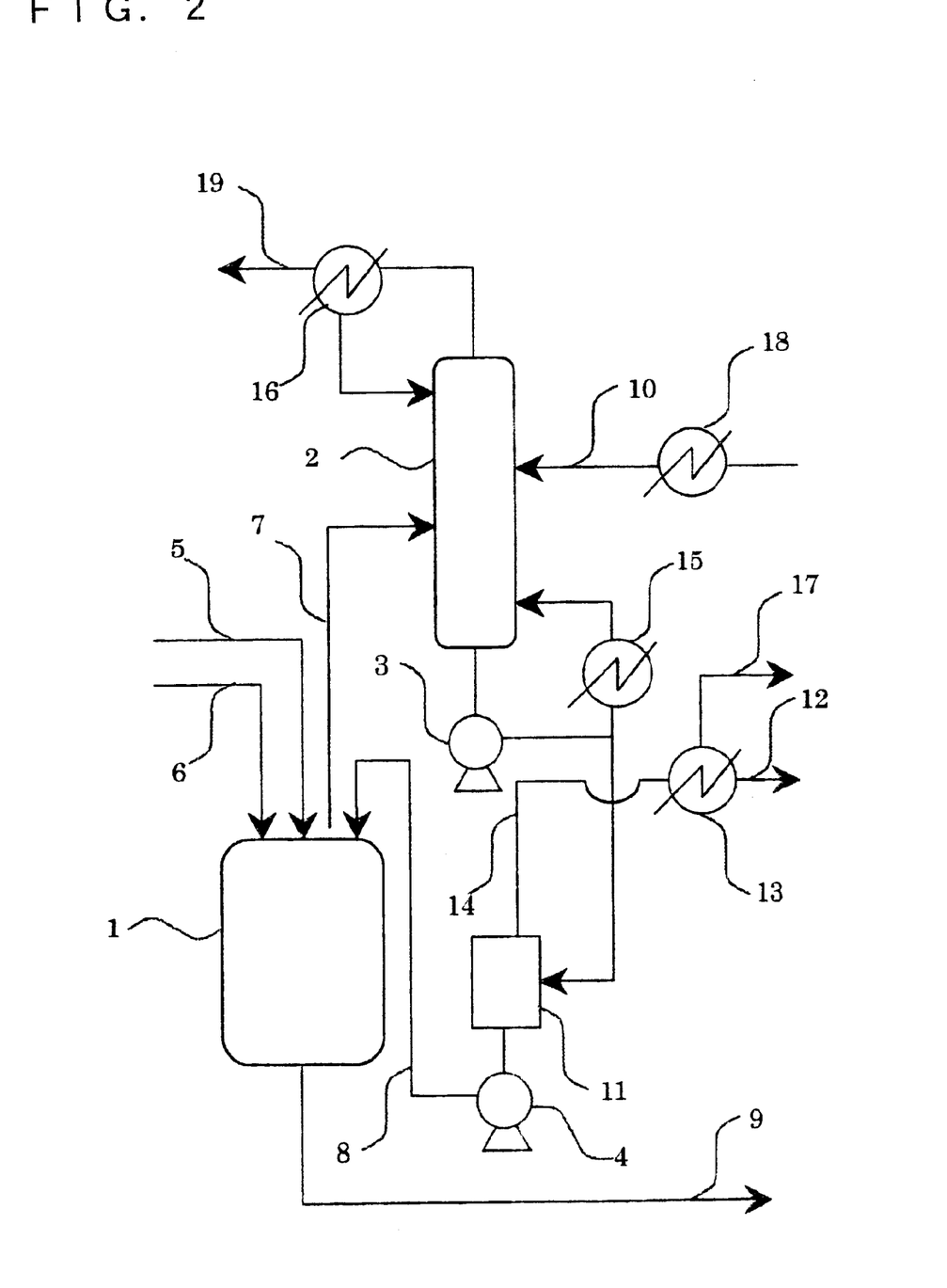
FIG. 2 is another typical flow diagram for carrying out the present invention.
Figure 3:
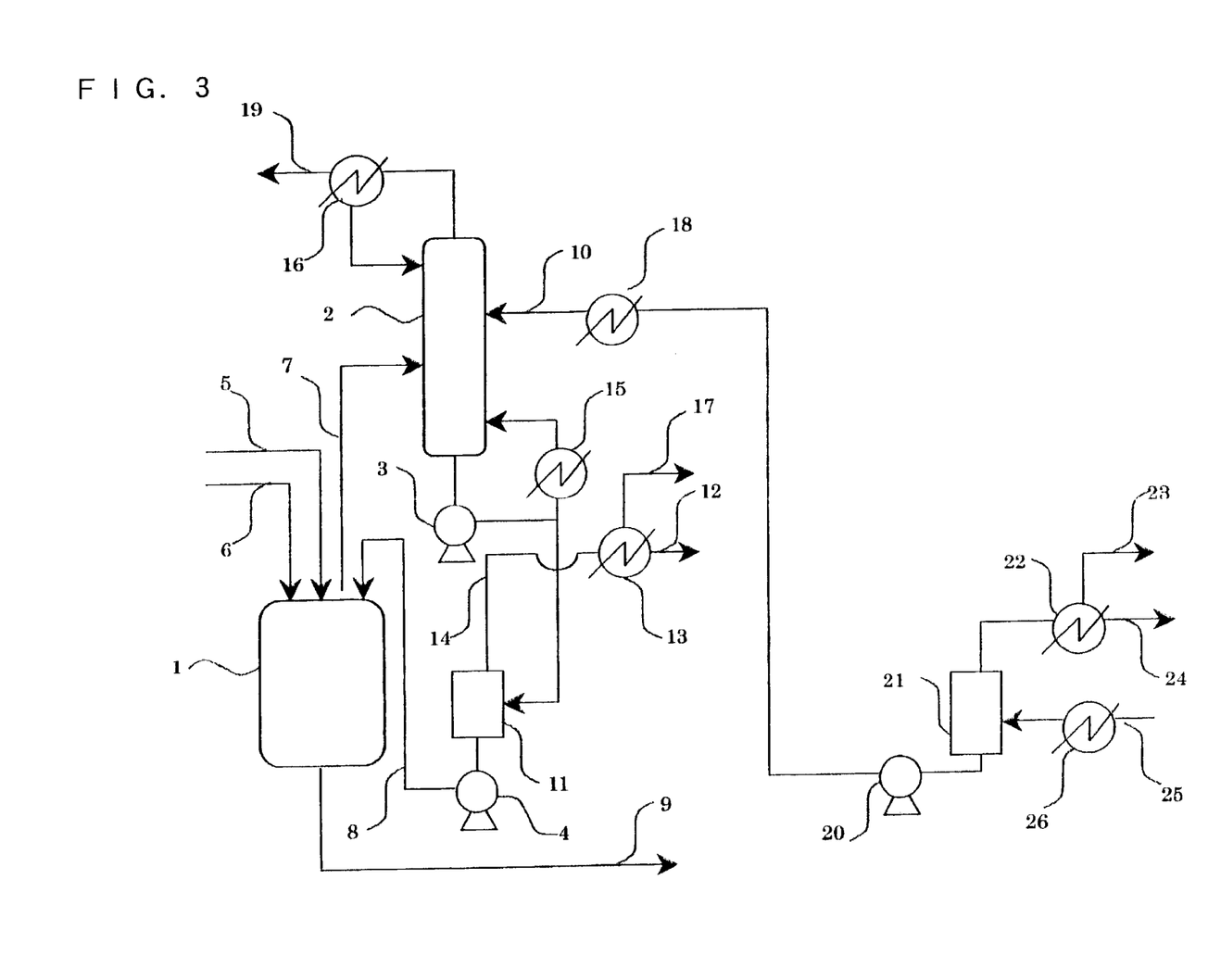
FIG. 3 is still another typical flow diagram for carrying out the present invention.

Preferred embodiments of the present invention will be described in detail with reference to the accompanying drawings. FIGS. 1, 2 and 3 are flow diagrams for carrying out the present invention. In the figures, the same numbers denote the same elements.

In the present invention, as described above, the distillate containing a glycol from the polycondensation reaction is subjected to at least flush distillation to remove the low-boiling substances and at least part of the residue is recycled as part of the above glycol in the above esterification or ester exchange reaction.

The above process will be described with reference to FIG. 1.

In FIG. 1, numeral 1 denotes an ester exchange reactor, and 2 a distillation column attached to the ester exchange reactor 1 and connected to the ester exchange reactor 1 by a pipe 7. As raw materials to be supplied into the ester exchange reactor 1, dimethyl terephthalate is supplied from a pipe 5, and an alkylene glycol having 2 to 4 carbon atoms and a reaction catalyst are supplied by a pipe 6. Methanol containing water, other decomposition low-boiling substances and an alkylene glycol having 2 to 4 carbon atoms distilling out from the ester exchange reactor 1 is supplied into the distillation column 2 attached to the ester exchange reactor 1 from the pipe 7. Further, vapor essentially composed of methanol rising to the top of the distillation column 2 is condensed by a condenser 16, passes through a pipe 19 and is discharged to the outside of a system. The bottoms of the distillation column 2 attached to the ester exchange reactor which comprises an alkylene glycol having 2 to 4 carbon atoms as the main component circulates through a pump 3 and a heater 15 and also is supplied as part of a raw material for the ester exchange reaction through a pipe 14. Numeral 11 denotes a flush distiller connected to a vacuum generator (not shown) by a pipe 17. A glycol component containing low-boiling substances recovered from a polycondensation reaction step is heated by a heater 18 through a pipe 10 and supplied into the flush distiller 11. The alkylene glycol component having 2 to 4 carbon atoms from which the low-boiling substances have been separated by the flush distiller 11 is returned to the ester exchange reactor 1 from a pipe 8 through a pump 4 and recycled as part of a returned raw material. The low-boiling substances separated by the flush distiller 11 are condensed by a condenser 13 and discharged to the outside of the system by a pipe 12. A low molecular weight polymer containing bishydroxyalkyl terephthalate which is the product of the ester exchange reaction is supplied into a first polycondensation reactor (not shown) by a pipe 9.

The process according to a preferred embodiment of the present invention is carried out by supplying the distillate containing the above glycol from the polycondensation reaction to the distillation column attached to the ester exchange or esterification reaction step before it is subjected to the above flush distillation and subjecting the bottoms of the distillation column to the above flush distillation.

This process will be described with reference to FIG. 2.

FIG. 2 is a flow diagram when the alkylene glycol component having 2 to 4 carbon atoms recovered from the polycondensation reaction step is supplied into the distillation column 2 attached to the ester exchange reactor to separate low-boiling substances therefrom and supplied into the flush distiller. The alkylene glycol component having 2 to 4 carbon atoms distilling out from the polycondensation reaction step is taken out as the bottoms of the distillation column 2 attached to the ester exchange reactor together with the alkylene glycol component having 2 to 4 carbon atoms distilling out from the ester exchange reactor 1, and part of the bottoms is supplied into the flush distiller 11 by the pump 3. The rest of the bottoms is supplied into the distillation column 2 attached to the ester exchange reactor through the heater 15 as in the process shown in FIG. 1. The alkylene glycol component having 2 to 4 carbon atoms from which low-boiling substances have been separated by the flush distiller 11 is supplied into the ester exchange reactor 1 through the pipe 8 and re-used. The low molecular weight polymer containing bishydroalkyl terephthalate which is the product of the ester exchange reaction is supplied into the first polycondensation reactor (not shown) through the pipe 9.

The process according to another preferred embodiment of the present invention is carried out by subjecting the distillate containing the glycol from the polycondensation reaction to flush distillation consisting of first flush distillation and second flush distillation, supplying the residue of the first flush distillation into a distillation column attached to the ester exchange or esterification reaction step before it is subjected to second flush distillation, and subjecting the bottoms of this distillation column to second flush distillation.

This process will be described with reference to FIG. 3.

FIG. 3 is a flow diagram when the alkylene glycol component having 2 to 4 carbon atoms recovered from the polycondensation step is introduced into a flush distiller 21 and then supplied into the distillation column 2 attached to the ester exchange reactor 1, and the bottoms of the distillation column 2 is supplied into another flush distiller 11. The flush distiller 21 is connected to a vacuum generator (not shown) through a condenser 22 and a pipe 24. The alkylene glycol component having 2 to 4 carbon atoms containing low-boiling substances recovered from the polycondensation reaction is heated by a heater 26 through a pipe 25 and supplied into the flush distiller 21. Thereafter, it is heated by the heater 18 through a pump 20 and introduced into the distillation column 2 attached to the ester exchange reactor. Since some of the low-boiling substances have already been separated and removed from the alkylene glycol component having 2 to 4 carbon atoms to be supplied into the distillation column 2 by the flush distiller 21 from a pipe 23, the alkylene glycol component has a small influence upon the operation load of the distillation column 2 attached to the ester exchange reactor. Thereafter, this alkylene glycol component having 2 to 4 carbon atoms is taken as the bottoms of the distillation column 2 attached to the ester exchange reactor together with the alkylene glycol component having 2 to 4 carbon atoms distilling out from the ester exchange reactor 1 and supplied into the flush distiller 11 through the pump 3. The rest of the bottoms is supplied into the distillation column 2 attached to the ester exchange reactor through the heater 15 as in the processes shown in FIGS. 1 and 2. The alkylene glycol component having 2 to 4 carbon atoms from which low-boiling substances have been separated by the flush distiller 11 is supplied into the ester exchange reactor 1 through the pipe 8 and re-used. The low molecular weight polymer containing bishydroxyalkyl terephthalate which is the product of the ester exchange reaction is supplied into the first polycondensation reactor (not shown) through the pipe 9.

The process for continuously producing polyalkylene terephthalate by the ester exchange method with the apparatus constituted as described above will be described in detail with reference to FIGS. 1, 2 and 3.

In FIG. 1, dimethyl terephthalate, alkylene glycol having 2 to 4 carbon atoms and tetrabutoxide titanate as raw materials are first supplied into the ester exchange reactor 1. The molar ratio of the alkylene glycol having 2 to 4 carbon atoms to the dimethyl terephthalate is preferably 1.1:1 to 2.5:1, particularly preferably 1.3:1 to 2.0:1. The inside temperature of the ester exchange reactor is set to 150 to 260° C., for example, and the supplied raw materials are subjected to an ester exchange reaction under normal pressure. By-produced vapor containing distilling methanol as the main component is introduced into the distillation column 2 attached to the ester exchange reactor from the pipe 7. The reaction product of the ester exchange reaction is transferred to a polycondensation reaction step to carry out a polycondensation reaction at a temperature of 200 to 300° C. and a reduced pressure. The numbers and types of the ester exchange reactors and the polycondensation reactors are not particularly limited. The operation pressure and temperature are not particularly limited as well. These reactions may be carried out in an inert gas atmosphere as required. Further, the finally obtained polyalkylene terephthalate polymer is pelletized in a granulation step or the like and the molecular weight thereof is further increased by solid-phase polymerization as required.

The by-produced vapor containing an alkylene glycol having 2 to 4 carbon atoms as the main component distilling out from each polycondensation reactor is condensed by a condenser and the condensed distillate is supplied into the flush distiller 11 through the pipe 10 and the heater 18. Since impurities including an interlocking scattered product are contained in the distillate, the interlocking scattered product is preferably removed by a metal net filter or centrifugal separator before it is supplied into the heater 18. The operation pressure of the flush distiller 11 and the temperature of the alkylene glycol component having 2 to 4 carbon atoms recovered from the polycondensation reaction step and supplied into the flush distiller 11 are not limited if they do not worsen the color of the final product, do not impede the activity of the catalyst, or do not affect the distillation step of the distillation column attached to the ester exchange reactor or other steps when the alkylene component having 2 to 4 carbon atoms from which low-boiling substances have been separated is recycled as a raw material. Since the activity of the catalyst is impeded when the amount of water separated from the alkylene glycol component having 2 to 4 carbon atoms is small, if 1,3-propanediol or 1,4-butanediol is used as the main alkylene glycol, the operation pressure and the supply temperature of the distillate containing 1,3-propanediol or 1,4-butanediol both of which ensure that the water content should become 0.5 wt % or less are preferably employed. When ethylene glycol is used as the main alkylene glycol, the operation pressure and the supply temperature of the distillate containing ethylene glycol both of which ensure that the water content should become 0.05 wt % or less are preferably employed. For example, a vacuum degree of less than 67 kPa and 13 kPa or more and a supply temperature of 130 to 220° C. are employed.

When ethylene glycol is used as the main alkylene glycol and the content of 2-methyl-1,3-dioxolan in the distillate containing ethylene glycol exceeds 50 ppm by weight or the content of methyl cellosolve exceeds 10 ppm by weight, the color of the product polymer worsens.

When the total content of low-boiling substances other than water contained in the alkylene glycol component having 2 to 4 carbon atoms to be recycled increases, the load of the distillation column 2 attached to the ester exchange reactor grows, whereby a large amount of equipment investment is required to cope with this, or the process becomes instable. Therefore, it is preferred to separate methanol and the above low-boiling substances by the flush distiller in addition to water.

FIG. 2 will be described hereinbelow. The by-produced vapor containing an alkylene glycol having 2 to 4 carbon atoms as the main component distilling out from the polycondensation reaction step is condensed by a condenser and the condensed distillate is supplied into the distillation column 2 attached to the ester exchange reactor through the pipe 10 and the heater 18. It is taken out as part of the bottoms of the distillation column 2 together with the alkylene glycol component having 2 to 4 carbon atoms distilling out from the ester exchange reactor and supplied into the ester exchange reactor 1 through the flush distiller 11 to be recycled. If the flush distillation step has no problem, the distilling temperature may be lowered to reduce the operation load of the distillation column 2 attached to the ester exchange reactor so as to raise the total concentration of the low-boiling substances in the bottoms.

FIG. 3 will be described next. The by-produced vapor containing an alkylene glycol having 2 to 4 carbon atoms as the main component distilling out from each polycondensation reactor is condensed by the condenser, and the condensed distillate is introduced into the flush distiller 21 through the pipe 25 and the heater 26. Thereafter, it is supplied into the distillation column 2 attached to the ester exchange reactor, taken out as part of the bottoms together with the alkylene glycol component having 2 to 4 carbon atoms distilling out from the ester exchange reaction, and supplied into the ester exchange reactor 1 through the flush distiller 11 to be recycled. As some of the low-boiling substances have already been separated and removed from the alkylene glycol component having 2 to 4 carbon atoms to be supplied into the distillation column 2 attached to the ester exchange reactor by the flush distiller 21, a more reduction in the load of the distillation column 2 attached to the ester exchange reactor is expected in this case than the process of FIG. 2. Moreover, even when the total amount of the low-boiling substances contained in the bottoms is increased by a change in the step of the distillation column 2 attached to the ester exchange reactor, the change can be absorbed by the flush distiller 11, whereby further stabilization of the process can be expected.

Use of the above-described process of the present invention eliminates the need of purifying the glycol component distilling out from polycondensation using large-scale distillation equipment separate from the system and makes it possible to cut the running cost and simplify the equipment because the reaction step does not become instable when small-scale flush distillation equipment whose installation cost and running cost are low is installed.

The load of the distillation column attached to the ester exchange reactor or the esterification reactor can be reduced by taking out the bottoms of the distillation column attached to the ester exchange reactor or esterification reactor and distilling it with the flush distiller, thereby making it possible to cut the running cost of the distillation column attached to the ester exchange reactor or esterification reactor and further the running cost of the whole system.

By distilling with the flush distiller, the water content of the alkylene glycol having 2 to 4 carbon atoms can be easily controlled to a predetermined value or less and even when it is recycled as a raw material, the reaction step does not become instable, whereby the running cost can be cut and the equipment can be simplified.

EXAMPLES

Examples of the present invention will be described with reference to the flow diagrams of FIGS. 1, 2 and 3.

A description is first given of a case where 1,4-butanediol is used as the alkylene glycol having 2 to 4 carbon atoms.

Example 1

In FIG. 1, dimethyl terephthalate was continuously supplied from the pipe 5 into the ester exchange reactor 1 at a rate of 37 kg/hr, and 1,4-butanediol and tetrabutoxide titanate were continuously supplied from the pipe 6 into the ester exchange reactor 1 at rates of 24 kg/hr and 0.03 kg/hr, respectively, to carry out an ester exchange reaction at a temperature of 160 to 190° C. under normal pressure. Methanol was distilled out in an amount of 85% of the theoretical amount thereof to obtain a low molecular weight polymer containing bishydroxybutyl terephthalate. Thereafter, the obtained low molecular weight polymer containing bishydroxybutyl terephthalate was continuously supplied into the first polycondensation reactor through the pipe 9 to carry out a polycondensation reaction at a temperature of 230° C. and a vacuum degree of 4.0 kPa to obtain a polybutylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polybutylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,4-butanediol which comprised 1.6 wt % of tetrahydrofuran, 12 wt % of methanol and 0.7 wt % of water from the first polycondensation reactor and the final polycondensation reactor was heated at 150° C. by the heater 18 and supplied into the flush distiller 11 through the pipe 10 at a rate of 7 kg/hr. The operation pressure of the flush distiller 11 was controlled to 27 kPa. The 1,4-butanediol component from which the low-boiling substances were separated by the flush distiller 11 contained 0.2 wt % of tetrahydrofuran, 2 wt % of methanol and 0.3 wt % of water. This 1,4-butanediol component was supplied into the ester exchange reactor 1 through the pipe 8 at a rate of 6 kg/hr and re-used as part of a glycol as a starting material. The supply rate of 1,4-butanediol from the pipe 6 was reduced to 18 kg/hr.

Example 2

In FIG. 2, dimethyl terephthalate was continuously supplied from the pipe 5 into the ester exchange reactor 1 at a rate of 37 kg/hr, and 1,4-butanediol and tetrabutoxide titanate were continuously supplied from the pipe 6 into the ester exchange reactor 1 at rates of 24 kg/hr and 0.03 kg/hr, respectively, to carry out an ester exchange reaction at a temperature of 160 to 190° C. under normal pressure. Methanol was distilled out in an amount of 85% of the theoretical amount thereof to obtain a low molecular weight polymer containing bishydroxybutyl terephthalate. Thereafter, the obtained low molecular weight polymer containing bishydroxybutyl terephthalate was continuously supplied into the first polycondensation reactor through the pipe 9 to carry out a polycondensation reaction at a temperature of 230° C. and a vacuum degree of 4.0 kPa to obtain a polybutylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polybutylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,4-butanediol which comprised 1.6 wt % of tetrahydrofuran, 12 wt % of methanol and 0.7 wt % of water from the first polycondensation reactor and the final polycondensation reactor was heated at 150° C. by the heater 18 and supplied into the distillation column 2 attached to the ester exchange reactor through the pipe 10 at a rate of 7 kg/hr. The 1,4-butanediol was supplied into the flush distiller 11 at 150° C. and a total rate of 11 kg/hr together with the 1,4-butanediol component distilling out into the distillation column 2 attached to the ester exchange reactor from the ester exchange reactor 1 at a rate of 4 kg/hr. The operation pressure of the flush distiller 11 was controlled to 27 kPa. The 1,4-butanediol component from which the low-boiling substances were separated by the flush distiller 11 contained 0.1 wt % or less of tetrahydrofuran, 0.1 wt % or less of methanol and 0.2 wt % of water. This 1,4-butanediol component was supplied into the ester exchange reactor 1 through the pipe 8 at a rate of 10 kg/hr and re-used as part of a glycol as a starting material. The supply rate of 1,4-butanediol from the pipe 6 was reduced to 18 kg/hr.

Example 3

In FIG. 3, dimethyl terephthalate was continuously supplied from the pipe 5 into the ester exchange reactor 1 at a rate of 37 kg/hr, and 1,4-butanediol and tetrabutoxide titanate were continuously supplied from the pipe 6 into the ester exchange reactor 1 at rates of 24 kg/hr and 0.03 kg/hr, respectively, to carry out an ester exchange reaction at a temperature of 160 to 190° C. under normal pressure.

Methanol was distilled out in an amount of 85% of the theoretical amount thereof to obtain a low molecular weight polymer containing bishydroxybutyl terephthalate. Thereafter, the obtained low molecular weight polymer containing bishydroxybutyl terephthalate was continuously supplied into the first polycondensation reactor through the pipe 9 to carry out a polycondensation reaction at a temperature of 230° C. and a vacuum degree of 4.0 kPa to obtain a polybutylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polybutylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,4-butanediol which comprised 1.6 wt % of tetrahydrofuran, 12 wt % of methanol and 0.7 wt % of water from the first polycondensation reactor and the final polycondensation reactor was heated at 150° C. by the heater 26 and supplied into the flush distiller 21 through the pipe 25 at a rate of 7 kg/hr. The operation pressure of the flush distiller 21 was controlled to 27 kPa. The 1,4-butanediol component from which the low-boiling substances were separated by the flush distiller 21 contained 0.2 wt % of tetrahydrofuran, 2 wt % of methanol and 0.3 wt % of water. This 1,4-butanediol component was re-heated at 150° C. by the heater 18 and supplied into the distillation column 2 attached to the ester exchange reactor through the pipe 10. It was supplied into the flush distiller 11 at 150° C. and a total rate of 11 kg/hr together with the 1,4-butanediol component distilling out into the distillation column 2 from the ester exchange reactor 1 at a rate of 4 kg/hr. The operation pressure of the flush distiller 11 was controlled to 27 kPa. The 1,4-butanediol component from which the low-boiling substances were separated by the flush distiller 11 contained 0.1 wt % or less of tetrahydrofuran, 0.1 wt % or less of methanol and 0.1 wt % of water. This 1,4-butanediol component was supplied into the ester exchange reactor 1 through the pipe 8 at a rate of 10 kg/hr and re-used as part of a glycol as a starting material. The supply rate of 1,4-butanediol from the pipe 6 was reduced to 18 kg/hr.

In the process for continuously producing polybutylene terephthalate described in the above Examples, even when the glycol component containing low-boiling substances formed from the polycondensation reaction step was recycled as part of a raw material without purification with large-scale distillation equipment separate from the system, stable production was possible without impeding the activity of the catalyst.

A description is subsequently given of a case where ethylene glycol is used as the alkylene glycol having at 2 to 4 carbon atoms. The colors in Examples were measured by a Hunter type color machine (Σ80 of Nippon Denshoku Kogyosha Co., Ltd.) to obtain L and b values. The L value indicates brightness and a polymer having a larger L value is brighter. The b value indicate yellow to blue color and a polymer having a smaller b value is less yellowish.

Example 4

In FIG. 1, dimethyl terephthalate was continuously. supplied from the pipe 5 into the ester exchange reactor 1 at a rate of 37 kg/hr, and ethylene glycol and manganese acetate tetrahydrate were continuously supplied from the pipe 6 into the ester exchange reactor 1 at rates of 21 kg/hr and 0.01 kg/hr, respectively, to carry out an ester exchange reaction at a temperature of 200 to 240° C. under normal pressure. Methanol was distilled out to obtain a low molecular weight polymer containing bishydroxyethyl terephthalate. Thereafter, the obtained low molecular weight polymer containing bishydroxyethyl terephthalate was continuously supplied into the first polycondensation reactor through the pipe 9 and antimony trioxide was added at a rate of 0.02 kg/hr to carry out a polycondensation reaction at a temperature of 290° C. and a vacuum degree of 4.0 kPa to obtain a polyethylene terephthalate low polymer. Subsequently, the obtained low polymer was continuously supplied into the final polycondensation reactor to carry out a polycondensation reaction at a temperature of 295 to 300° C. and a vacuum degree of 0.2 kPa. The obtained polyethylene terephthalate polymer had an intrinsic viscosity (value calculated from a solution viscosity measured at 35° C. in orthochlorophenol) of 0.62 and was taken out by the gear pump and pelletized in a granulation step.

The distillate containing ethylene glycol which comprised 0.7 wt % of methanol and 1.5 wt % of water from the first polycondensation reactor and the final polycondensation reactor was heated at 150° C. by the heater 18 and supplied into the flush distiller 11 through the pipe 10 at a rate of 9 kg/hr. The operation pressure of the flush distiller 11 was controlled to 27 kPa. The ethylene glycol component from which the low-boiling substances were separated by the flush distiller 11 contained 0.01 wt % of methanol and 0.04 wt % of water. This ethylene glycol component was supplied into the ester exchange reactor 1 through the pipe 8 at a rate of 9 kg/hr and re-used as part of a glycol as a starting material. The supply rate of ethylene glycol from the pipe 6 was reduced to 12 kg/hr.

Example 5

In FIG. 2, dimethyl terephthalate was continuously supplied from the pipe 5 into the ester exchange reactor 1 at a rate of 37 kg/hr, and ethylene glycol and manganese acetate tetrahydrate were continuously supplied from the pipe 6 into the ester exchange reactor 1 at rates of 21 kg/hr and 0.01 kg/hr, respectively, to carry out an ester exchange reaction at a temperature of 200 to 240° C. under normal pressure. Methanol was distilled out to obtain a low molecular weight polymer containing bishydroxyethyl terephthalate. Thereafter, the obtained low molecular weight polymer containing bishydroxyethyl terephthalate was continuously supplied into the first polycondensation reactor through the pipe 9 and antimony trioxide was added at a rate of 0.02 kg/hr to carry out a polycondensation reaction at a temperature of 290° C. and a vacuum degree of 4.0 kPa to obtain a polyethylene terephthalate low polymer. Subsequently, the obtained low polymer was continuously supplied into the final polycondensation reactor to carry out a polycondensation reaction at a temperature of 295 to 300° C. and a vacuum degree of 0.2 kPa. The obtained polyethylene terephthalate polymer had an intrinsic viscosity (value calculated from a solution viscosity measured at 35° C. in orthochlorophenol) of 0.62 and was taken out by a gear pump and pelletized in a granulation step.

The distillate containing ethylene glycol which comprised 0.7 wt % of methanol and 1.5 wt % of water from the first polycondensation reactor and the final polycondensation reactor was heated at 150° C. by the heater 18 and supplied into the distillation column 2 attached to the ester exchange reactor through the pipe 10 at a rate of 9 kg/hr. The ethylene glycol component was supplied into the flush distiller 11 at 150° C. and a total rate of 13 kg/hr together with the ethylene glycol component distilling out into the distillation column 2 attached to the ester exchange reactor from the ester exchange reactor 1 at a rate of 4 kg/hr. The operation pressure of the flush distiller 11 was controlled to 27 kPa. The ethylene glycol component from which the low-boiling substances were separated by the flush distiller 11 contained 0.01 wt % of methanol and 0.04 wt % of water. This ethylene glycol component was supplied into the ester exchange reactor 1 through the pipe 8 at a rate of 13 kg/hr and re-used as part of a glycol as a starting material. The supply rate of ethylene glycol from the pipe 6 was reduced to 12 kg/hr.

Example 6

In FIG. 3, dimethyl terephthalate was continuously supplied from the pipe 5 into the ester exchange reactor 1 at a rate of 37 kg/hr, and ethylene glycol and manganese acetate tetrahydrate were continuously supplied from the pipe 6 into the ester exchange reactor 1 at rates of 21 kg/hr and 0.01 kg/hr, respectively, to carry out an ester exchange reaction at a temperature of 200 to 240° C. under normal pressure. Methanol was distilled out to obtain a low molecular weight polymer containing bishydroxyethyl terephthalate. Thereafter, the obtained low molecular weight polymer containing bishydroxyethyl terephthalate was continuously supplied into the first polycondensation reactor through the pipe 9 and antimony trioxide was added at a rate of 0.02 kg/hr to carry out a polycondensation reaction at a temperature of 290° C. and a vacuum degree of 4.0 kPa to obtain a polyethylene terephthalate low polymer. Subsequently, the obtained low polymer was continuously supplied into the final polycondensation reactor to carry out a polycondensation reaction at a temperature of 295 to 300° C. and a vacuum degree of 0.2 kPa. The obtained polyethylene terephthalate polymer had an intrinsic viscosity (value calculated from a solution viscosity measured at 35° C. in orthochlorophenol) of 0.62 and was taken out by the gear pump and pelletized in a granulation step.

The distillate containing ethylene glycol which comprised 0.7 wt % of methanol and 1.5 wt % of water from the first polycondensation reactor and the final polycondensation reactor was heated at 140° C. by the heater 26 and supplied into the flush distiller 21 through the pipe 25 at a rate of 9 kg/hr. The operation pressure of the flush distiller 21 was controlled to 27 kPa. The ethylene,glycol component from which the low-boiling substances were separated by the flush distiller 21 contained 0.03 wt % of methanol and 0.10 wt % of water. This ethylene glycol component was re-heated at 150° C. by the heater 18 and supplied into the distillation column 2 attached to the ester exchange reactor through the pipe 10. It was supplied into the flush distiller 11 at 150° C. and a total rate of 13 kg/hr together with the ethylene glycol component distilling out into the distillation column 2 from the ester exchange reactor 1 at a rate of 4 kg/hr. The operation pressure of the flush distiller 11 was controlled to 27 kPa. The ethylene glycol component from which the low-boiling substances were separated by the flush distiller 11 contained 0.01 wt % of methanol and 0.04 wt % of water. This ethylene glycol component was supplied into the ester exchange reactor 1 through the pipe 8 at a rate of 13 kg/hr and re-used as part of a glycol as a starting material. The supply rate of ethylene glycol from the pipe 6 was reduced to 12 kg/hr.

In the process for continuously producing polyethylene terephthalate described in the above Examples 1 to 6, even when the glycol component containing low-boiling substances formed from the polycondensation reaction step was recycled as part of a raw material without purification with large-scale distillation equipment separate from the system, stable production was possible without impeding the activity of the catalyst.

Example 7

In FIG. 1, dimethyl terephthalate was continuously supplied from the pipe 5 into the ester exchange reactor 1 at a rate of 37 kg/hr, and ethylene glycol and manganese acetate tetrahydrate were continuously supplied from the pipe 6 into the ester exchange reactor 1 at rates of 21 kg/hr and 0.01 kg/hr, respectively, to carry out an ester exchange reaction at a temperature of 200 to 240° C. under normal pressure. Methanol was distilled out to obtain a low molecular weight polymer containing bishydroxyethyl terephthalate. Thereafter, the obtained low molecular weight polymer containing bishydroxyethyl terephthalate was continuously supplied into the first polycondensation reactor through the pipe 9 and antimony trioxide was added at a rate of 0.02 kg/hr to carry out a polycondensation reaction at a temperature of 290° C. and a vacuum degree of 4.0 kPa to obtain a polyethylene terephthalate low polymer. Subsequently, the obtained low polymer was continuously supplied into the final polycondensation reactor to carry out a polycondensation reaction at a temperature of 295 to 300° C. and a vacuum degree of 0.2 kPa. The obtained polyethylene terephthalate polymer had an intrinsic viscosity (value calculated from a solution viscosity measured at 35° C. in orthochlorophenol) of 0.62 and was taken out by the gear pump and pelletized in a granulation step.

Ethylene glycol which comprised 0.7 wt % of methanol, 1.4 wt % of water and 400 ppm by weight of 2-methyl-1,3-dioxolan from the first polycondensation reactor and the final polycondensation reactor was heated at 155° C. by the heater 18 and supplied into the flush distiller 11 through the pipe 10 at a rate of 9 kg/hr. The operation pressure of the flush distiller 11 was controlled to 27 kPa. The ethylene glycol component from which the low-boiling substances were separated by the flush distiller 11 contained 0.01 wt % of methanol, 0.03 wt % of water and 40 ppm by weigh to 2-methyl-1,3-dioxolan. This ethylene glycol component was supplied into the ester exchange reactor 1 through the pipe 8 at a rate of 9 kg/hr and re-used as part of a glycol as a starting material. The supply rate of ethylene glycol from the pipe 6 was reduced to 12 kg/hr.

In the process for continuously producing polyethylene terephthalate as described above, even when the glycol component containing low-boiling substances formed in the polycondensation reaction step was recycled as part of a raw material without purification with large-scale distillation equipment separate from the system, stable production was possible without impeding the activity of the catalyst and the color of the polyethylene terephthalate product was excellent with an L value of 68 and a b value of +1.5.

Example 8

In FIG. 1, dimethyl terephthalate was continuously supplied from the pipe 5 into the ester exchange reactor 1 at a rate of 37 kg/hr, and ethylene glycol and manganese acetate tetrahydrate were continuously supplied from the pipe 6 into the ester exchange reactor 1 at rates of 21 kg/hr and 0.01 kg/hr, respectively, to carry out an ester exchange reaction at a temperature of 200 to 240° C. under normal pressure. Methanol was distilled out to obtain a low molecular weight polymer containing bishydroxyethyl terephthalate. Thereafter, the obtained low molecular weight polymer containing bishydroxyethyl terephthalate was continuously supplied into the first polycondensation reactor through the pipe 9 and antimony trioxide was added at a rate of 0.02 kg/hr to carry out a polycondensation reaction at a temperature of 290° C. and a vacuum degree of 4.0 kPa to obtain a polyethylene terephthalate low polymer. Subsequently, the obtained low polymer was continuously supplied into the final polycondensation reactor to carry out a polycondensation reaction at a temperature of 295 to 300° C. and a vacuum degree of 0.2 kPa. The obtained polyethylene terephthalate polymer had an intrinsic viscosity (value calculated from a solution viscosity measured at 35° C. in orthochlorophenol) of 0.62 and was taken out by the gear pump and pelletized in a granulation step.

Ethylene glycol which comprised 0.7 wt % of methanol, 1.4 wt % of water and 500 ppm by weight of methyl cellosolve from the first polycondensation reactor and the final polycondensation reactor was heated at 155° C. by the heater 18 and supplied into the flush distiller 11 through the pipe 10 at a rate of 9 kg/hr. The operation pressure of the flush distiller 11 was controlled to 27 kPa. The ethylene glycol component from which the low-boiling substances were separated by the flush distiller 11 contained 0.01 wt % of methanol, 0.03 wt % of water and 8 ppm by weight of 2-methyl-1,3-dioxolan. This ethylene glycol component was supplied into the ester exchange reactor 1 through the pipe 8 at a rate of 9 kg/hr and re-used as part of a glycol as a starting material. The supply rate of ethylene glycol from the pipe 6 was reduced to 12 kg/hr.

In the process for continuously producing polyethylene terephthalate as described above, even when the glycol component containing low-boiling substances formed in the polycondensation reaction step was recycled as part of a raw material without purification with large-scale distillation equipment separate from the system, stable production was possible without impeding the activity of the catalyst and the color of the polyethylene terephthalate product was excellent with an L value of 68 and a b value of +1.4.

Comparative Example 1

For comparison with Examples, the distillate comprising ethylene glycol as the main component from the first polycondensation reactor and the final polycondensation reactor was directly supplied into the ester exchange reactor 1 without being treated with the flush distiller and re-used as part of a glycol as a starting material to produce polyethylene terephthalate. The activity of the ester exchange catalyst was impeded, thereby making the ester exchange reaction step instable and fluctuating the distillation load of the distillation column attached to the ester exchange reactor with the result that stable operation was impossible. As for the color of the polyethylene terephthalate product thus produced, it had an L value of 60 and a b value of +3.0.

A description is subsequently given of a case where 1,3-propanediol was used as the alkylene glycol having 2 to 4 carbon atoms.

Example 9

In FIG. 1, dimethyl terephthalate was continuously supplied from the pipe 5 into the ester exchange reactor 1 at a rate of 37 kg/hr, and 1,3-propanediol and tetrabutoxide titanate were continuously supplied from the pipe 6 into the ester exchange reactor 1 at rates of 22 kg/hr and 0.03 kg/hr, respectively, to carry out an ester exchange reaction at a temperature of 200 to 220° C. under normal pressure. Methanol was distilled out to obtain a low molecular weight polymer containing bishydroxypropyl terephthalate. Thereafter, the obtained low molecular weight polymer containing bishydroxypropyl terephthalate was continuously supplied into the first polycondensation reactor through the pipe 9 to carry out a polycondensation reaction at a temperature of 235° C. and a vacuum degree of 4.0 kPa to obtain a polypropylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polypropylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,3-propanediol which comprised 500 ppm by weight of allyl alcohol, 2 wt % of methanol and 0.7 wt % of water from the first polycondensation reactor and the final polycondensation reactor was heated at 200° C. by the heater 18 and supplied into the flush distiller 11 through the pipe 10 at a rate of 7.5 kg/hr. The operation pressure of the flush distiller 11 was controlled to 13 kPa. The 1,3-propanediol component from which the low-boiling substances were separated by the flush distiller 11 contained 150 ppm by weight of allyl alcohol, 0.3 wt % of methanol and 0.2 wt % of water. This 1,3-propanediol component was supplied into the ester exchange reactor 1 through the pipe 8 at a rate of 7 kg/hr and re-used as part of a glycol as a starting material. The supply rate of 1,3-propanediol from the pipe 6 was reduced to 15 kg/hr.

Example 10

In FIG. 2, dimethyl terephthalate was continuously supplied from the pipe 5 into the ester exchange reactor 1 at a rate of 37 kg/hr, and 1,3-propanediol and tetrabutoxide titanate were continuously supplied from the pipe 6 into the ester exchange reactor 1 at rates of 22 kg/hr and 0.03 kg/hr, respectively, to carry out an ester exchange reaction at a temperature of 200 to 220° C. under normal pressure. Methanol was distilled out to obtain a low molecular weight polymer containing bishydroxypropyl terephthalate. Thereafter, the obtained low molecular weight polymer containing bishydroxypropyl terephthalate was continuously supplied into the first polycondensation reactor through the pipe 9 to carry out a polycondensation reaction at a temperature of 235° C. and a vacuum degree of 4.0 kPa to obtain a polypropylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polypropylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,3-propanediol which comprised 500 ppm by weight of allyl alcohol, 2 wt % of methanol and 0.7 wt % of water from the first polycondensation reactor and the final polycondensation reactor was heated at 200° C. by the heater 18 and supplied into the distillation column 2 attached to the ester exchange reactor through the pipe 10 at a rate of 7.5 kg/hr. It was further supplied into the flush distiller 11 at 200° C. and a total rate of 11.5 kg/hr together with the 1,3-propanediol component distilling out into the distillation column 2 attached to the ester exchange reactor from the ester exchange reactor 1 at a rate of 4 kg/hr. The operation pressure of the flush distiller 11 was controlled to 13 kPa. The 1,3-propanediol component from which the low-boiling substances were separated by the flush distiller 11 contained 10 ppm by weight of allyl alcohol, 0.1 wt % or less of methanol and 0.1 wt % or less of water. This 1,3-propanediol component was supplied into the ester exchange reactor 1 through the pipe 8 at a rate of 9 kg/hr and re-used as part of a glycol as a starting material. The supply rate of 1,3-propanediol from the pipe 6 was reduced to 17 kg/hr.

Example 11

In FIG. 3, dimethyl terephthalate was continuously supplied from the pipe 5 into the ester exchange reactor 1 at a rate of 37 kg/hr, and 1,3-propanediol and tetrabutoxide titanate were continuously supplied from the pipe 6 into the ester exchange reactor 1 at rates of 22 kg/hr and 0.03 kg/hr, respectively, to carry out an ester exchange reaction at a temperature of 200 to 220° C. under normal pressure. Methanol was distilled out to obtain a low molecular weight polymer containing bishydroxypropyl terephthalate. Thereafter, the obtained low molecular weight polymer containing bishydroxypropyl terephthalate was continuously supplied into the first polycondensation reactor through the pipe 9 to carry out a polycondensation reaction at a temperature of 235° C. and a vacuum degree of 4.0 kPa to obtain a polypropylene terephthalate low polymer. Subsequently, the obtained low polymer was continuously supplied into the final polycondensation reactor to carry out a polycondensation reaction at a temperature of 247 to 248° C. and a vacuum degree of 0.2 kPa. The obtained polypropylene terephthalate polymer had an intrinsic viscosity (value calculated from a solution viscosity measured at 35° C. in orthochlorophenol) of 0.62 and was taken out by the gear pump and pelletized in a granulation step.

The distillate containing 1,3-propanediol which comprised 500 ppm by weight of allyl alcohol, 2 wt % of methanol and 0.7 wt % of water from the first polycondensation reactor and the final polycondensation reactor was heated at 200° C. by the heater 26 and supplied into the flush distiller 21 through the pipe 25 at a rate of 7.5 kg/hr. The operation pressure of the flush distiller 21 was controlled to 13 kPa. The 1,3-propanediol component from which the low-boiling substances were separated by the flush distiller 21 contained 150 ppm by weight of allyl alcohol, 0.3 wt % of methanol and 0.2 wt % of water. This 1,3-propanediol component was re-heated at 200° C. by the heater 18 and supplied into the distillation column 2 attached to the ester exchange reactor through the pipe 10. It was further supplied into the flush distiller 11 at 200° C. and a total rate of 11.5 kg/hr together with the 1,3-propanediol component distilling out into the distillation column 2 from the ester exchange reactor 1 at a rate of 4 kg/hr. The operation pressure of the flush distiller 11 was controlled to 13 kPa. The 1,3-propanediol component from which the low-boiling substances were separated by the flush distiller 11 contained 10 ppm or less by weight of ally alcohol, 0.1 wt % or less of methanol and 0.1 wt % or less of water. This 1,3-propanediol component was supplied into the ester exchange reactor 1 through the pipe 8 at a rate of 9 kg/hr and re-used as part of a glycol as a starting material. The supply rate of 1,3-propanediol from the pipe 6 was reduced to 17 kg/hr.

In the process for continuously producing polypropylene terephthalate described in the above Examples, even when the glycol component containing low-boiling substances formed from the polycondensation reaction step was recycled as part of a raw material without purification with large-scale distillation equipment separate from the system, stable production was possible without impeding the activity of the catalyst.

According to the present invention, when a polyester is to be continuously produced from an aromatic dicarboxylic acid or lower alkyl ester thereof and a glycol component essentially composed of an alkylene glycol having 2 to 4 carbon atoms, the glycol component recovered from the polycondensation step does not need to be purified with a purifying device separate from the system and can be recycled as a high-purity raw material having a small content of water by installing a small-scale flush distiller, the running cost can be cut, the equipment can be simplified, and further a process for continuously producing a stable and inexpensive polyester can be provided.

What is claimed is:

1. A process for continuously producing an aromatic polyester from an aromatic dicarboxylic acid as the main dicarboxylic acid component and at least one glycol selected from the group consisting of ethylene glycol, 1,3-propanediol and 1,4-butanediol as the main glycol component through an esterification or ester exchange reaction and a polycondensation reaction, wherein a distillate containing said glycol from the polycondensation reaction is subjected to at least flush distillation to remove low-boiling substances and at least part of the residue is recycled as part of said glycol for said esterification or ester exchange reaction.

2. The process of claim 1, wherein the distillate containing said glycol from the polycondensation reaction is supplied into a distillation column used in the step of carrying out an ester exchange or esterification reaction before it is subjected to said flush distillation and then the bottoms of the distillation column is subjected to said flush distillation.

3. The process of claim 1, wherein the distillate containing said glycol from the polycondensation reaction is subjected to flush distillation consisting of first flush distillation and second flush distillation, the residue of said first flush distillation is supplied into a distillation column used in the step of carrying out an ester exchange or esterification reaction before it is subjected to said second flush distillation, and then the bottoms of the distillation column is subjected to said second flush distillation.

4. The process of any one of claims 1 to 3, wherein the aromatic polyester comprising 1,4-butanediol as the main glycol component is produced by recycling a residue comprising 0.5 wt % or less of water as said residue to the ester exchange or esterification reaction.

5. The process of any one of claims 1 to 3, wherein the aromatic polyester comprising ethylene glycol as the main glycol component is produced through an ester exchange reaction and a polycondensation reaction by recycling a residue comprising 0.05 wt % or less of water as said residue to the ester exchange reaction.

6. The process of any one of claims 1 to 3, wherein the aromatic polyester comprising ethylene glycol as the main glycol component is produced by recycling a residue comprising 50 ppm or less of 2-methyl-1,3-dioxolan as said residue to the ester exchange or esterification reaction.

7. The process of any one of claims 1 to 3, wherein the aromatic polyester comprising ethylene glycol as the main glycol component is produced by recycling a residue comprising 10 ppm or less of methyl cellosolve as said residue to the ester exchange or esterification reaction.

8. The process of any one of claims 1 to 3, wherein the aromatic polyester comprising 1,3-propanediol as the main glycol component is produced by recycling a residue comprising 0.5 wt % or less of water as said residue to the ester exchange or esterification reaction.

* * * * *